United States Patent

[11] 3,536,259

[72] Inventor Ikumasa Okumura
     Tokyo-To, Japan
[21] Appl. No. 666,266
[22] Filed Sept. 8, 1967
[45] Patented Oct. 27, 1970
[73] Assignee Nippon Kokuyu Tetsudo
     Tokyo-To, Japan
[32] Priority Sept. 13, 1966
[33] Japan
[31] 41/60,097

[54] FAIL SAFE COMPUTER
     3 Claims, 5 Drawing Figs.
[52] U.S. Cl. ................................................. 235/153,
                                              340/146.1, 307/88
[51] Int. Cl. .................................................. H03k 19/162,
                                              G06f 15/16, G06f 11/00
[50] Field of Search ............................................. 235/153;-
                                              340/146.1; 307/204, 219, 88(P)

[56] References Cited
     UNITED STATES PATENTS
     2,950,464  8/1960  Hinton et al. .................. 340/146.1X
     3,130,386  4/1964  Barbagallo et al. ............ 340/146.1
     3,161,732  12/1964 Martin et al. .................. 340/146.1X
     3,409,879  11/1968 Keister ......................... 340/146.1X OTHER REFERENCES
Hashimoto,A. et al. Failsafe Logic and Duplicated Logic Through the Use of Asymmetrically Faulty Elements. In Electronics and Communications in Japan (English edition of Denki Tsushin Gakkai Zasshi). 50(4):p.203— 212. April 1967. 235/153.

Watanabe.T. et al. Fail-Safe Logical System. In Electronics and Communications in Japan (English edition of Denki Tsushin Gakkai Zasshi). 50(2): p.134— 137. Feburary 1967. 235/153.

Primary Examiner—Malcolm A. Morrison
Assistant Examiner—R. Stephen Dildine,Jr
Attorneys—Robert E. Burns and Emmanuel J. Lobato ABSTRACT: A serial duplex organization of parts in a control computer in which fail safe logical elements exhibiting mutually different characteristics in the event of failure are used respectively in two systems carrying out operations of the same content, whereby the two systems respectively produce outputs corresponding to "0" and "1" in the event of failure, and comparison circuits detect failures and produce signals for controlling the progress of the control program and for controlling outputs of output registers on the unsafe side to cause the systems to operate always on the safe side in the event of failure.

FAIL SAFE COMPUTER

This invention relates to electronic computers for control and more particularly to a new organization of parts constituting a serial duplex system which operates on the safe side when failure such as to give rise to a serious consequence occurs in either or both of the two systems.

Interlocking systems for railway signals generally used heretofore have been control systems for receiving as input information the states of the signal levers at a control board, train switches, and track relay contacts obtained during running of a train and other information and causing the switches and signals to be controlled in accordance with the states of various locking relationships thereby to provide safe and positive routing of trains in a station yard. Thus, these interlocking systems are of high importance for maintenance of safety in train operations.

However, while relay interlocking devices and like means in which relays are used as logical elements are installed in systems of this character, such devices, by themselves, are not completely sufficient. Accordingly, in the present state of the art, there is a need for the introduction of electronic computers of high accuracy for simplification of maintenance and construction consonant with the modernization of railway signaling.

Of course, electronic computers (hereinafter referred to as computers) for control have heretofore been used. However, the measures with respect to hardware failures of these computers have been merely expedients to improve reliability and to augment the system, whereby there has been a deficiency in that means for operation on the safe side in the event of occurrence of a defect or failure have not received adequate consideration.

In the application of computers to signal equipment, the most difficult problem is the provision of measures with respect to failures. For example, in the standard specifications for signal equipment and installations established by the Japanese National Railways, it is specified as a general and basic rule that signal equipment should be so adapted and installed that it will operate on the safe side in the event of occurrence therein of abnormal operation or failure. In spite of this provision, however, there has been no realization to date of an effective measure for fully satisfying this requirement.

It is an object of the present invention to provide, in a computer for control of a system, an organization including an activating part which operates immediately to cause the system to operate on the safe side when a failure such as to give rise to a serious result in the system occurs in the computer as, for example, when a failure occurs in an interlocking system for railway signals and results in a state wherein a serious outcome such as a train collision can occur.

The fail-safe computer of the invention has an organization of one kind of series duplex system and differs from a conventional duplex system in that the logical elements used in the two systems are fail safe elements, that is, elements which are so adapted that either one of the failure state outputs always settles at a predetermined value, as described more fully below.

In the constructional example described herein, the "AND" or "OR" elements utilize a so-called parametron. Logical value "1" or "0" of the parametron corresponds the "$\pi$" phase or "0" phase of an oscillation output current and does not correspond to "ON" or "OFF" of a current or voltage as in the case of general logical element. The fail-safe element consists of a parametron having an oscillation core hole and a fail-safe sensing wire which is wound around said oscillation core so that when any failure occurs said parametron is made to oscillate in response to phase of the sensing current in said sensing wire. Even in the case when it has become impossible to obtain input current to the parametron owing to breakdown of wire or failure of the element, the oscillations are still generated owing to the phase of the current in the sensing wire, so that a fail-safe condition can be effectively confirmed. In the circuit producing output "0" at failure, if the phase of the sensing current of the fail-safe sensing wire is set at "0" phase, oscillation will occur at "0" phase. That is, it is possible to generate logical element producing output "1" at failure, the parametron capable of operating as above can be obtained by setting the phase of the sensing current in the fail-safe sensing wire to "$\pi$" phase. The manner of imparting the fail-safe sensing current does not necessitate any particular form of symbolic logical circuit, so that the circuit adapted to produce output "0" at failure and the circuit adapted to produce output "1" at failure are represented by the same symbol.

In a conventional duplex system, when malfunctions occur simultaneously in the two systems, and their logical values coincide, detection of the malfunctions is not possible. Consequently, there is a high probability of the computer operation being continued with the assumption that the operation is normal in spite of the fact that malfunctions have actually occurred, and this condition becomes a cause of failure of fail-out nature.

In contrast, in the duplex system of the present invention, use is made of logical elements having characteristics which differ respectively when the systems constituting the duplex system fail. More specifically, of the two systems, one is a "system producing output '0' at failure" which contains an element whose output always becomes "0" when the element becomes defective, while the other is a "system producing output '1' at failure" which contains an element whose output always becomes "1" when the element becomes defective. Therefore, a malfunction of the system composed of these two opposed systems can be readily and positively detected by comparing these two systems.

In other words, the computer of the invention is organized to accomplish the operation of causing the two systems to carry out continual computer operations of the same content, comparing the logical values of the two systems to check and verify whether these values are always coincident and to produce a "check completion signal", and controlling the program steps in response to the check completion signal. Accordingly, detection of failures as described above can be accomplished, whereby a fail-safe system is obtained. At the same time, since control instructions are stored in an output register only when the logical values of the two systems are coincident, the stored contents of the output register operate immediately on the safe side when the logical values of the two systems become noncoincident.

The logical values of the circuits according to the invention have the following significant meaning. In the logical circuit which produces an output "0" at failure, the logical value "0" is the "safe" output. That is, in the system which becomes safe at failure the logical value produced at failure should be taken as the value under safe conditions. For example, in the case of a preservation device for a railway signal, when a logical system adapted to produce "0" at failure is adopted, logical values "0" and "1" are, respectively, made to correspond to a "stop signal" in the safe condition, and to an "advance signal" on the danger side. Accordingly, the advance signal can be sent out only when there is no failure in the device. In the case when any failure occurs in the circuit, the circuit system corresponds to the case in which signal "0" is produced at failure, so that the logical value becomes "0" at failure. That is, the signal is converted to a "stop signal" on the safe side, whereby the vehicle stops, thus avoiding the state of danger for the vehicle. In the circuit system adapted to produce "1" at failure, the operating manner is reverse to that of the circuit system mentioned above. As a whole, the logical value produced at failure will be denoted as the logical value of the safe side, and the logical value produced and sent out only when circuit conditions are favorable and normal will be denoted as the logical value of the unsafe side. Thus, the device can be denoted as a fail-safe device. That is, in the fail-safe computer according to the invention, when a malfunction occurs in any of the components constituting the system, the malfunction is always detected by comparison circuits of the two systems, whereupon the execution of the computer program is stopped, and the contents of the output registers always operate on the safe side.

According to the present invention, briefly summarized, there is provided, in a computer for control, a fail-safe organization of parts characterized by the combination of two systems respectively producing outputs "0" and "1" in the event of failure therein, both systems being caused to carry out operations of identical content and having mutually corresponding registers, including output registers, and information paths, and comparison circuits for detecting failures provided with respect to the registers or in the information paths and producing output signals for controlling the progress of a program according to which control is being effected and for controlling outputs on the unsafe side of the output registers thereby to cause the systems to operate always on the safe side when a failure occurs in any part thereof.

The nature, principle, details, and utility of the invention will be more clearly apparent from the following detailed description with respect to a preferred embodiment of the invention when read in conjunction with the accompanying drawing.

Figure 1:
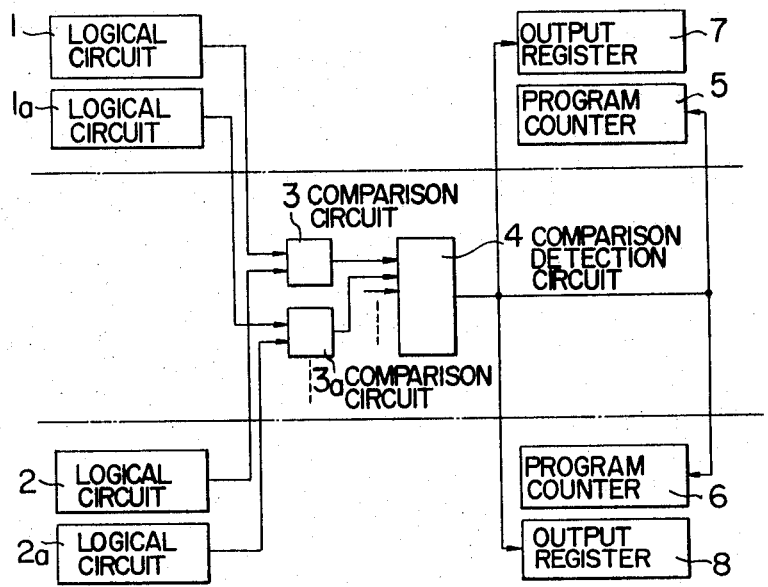
FIG. 1 is a block diagram indicating the essential organization of an example of a fail-safe computer embodying the invention.
Figure 3A:
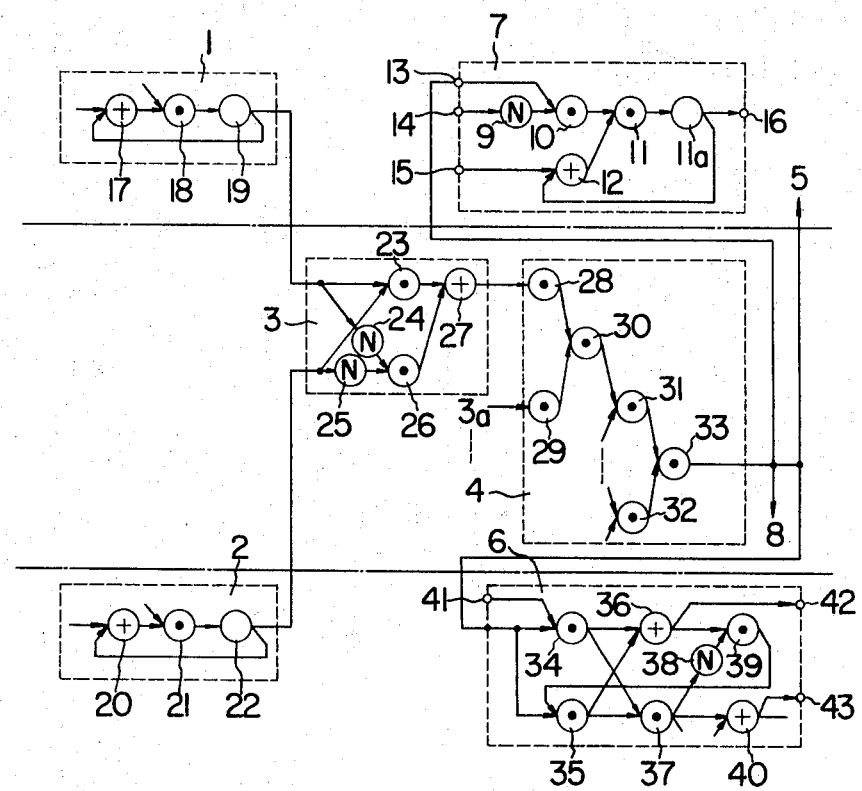
Figure 3B:
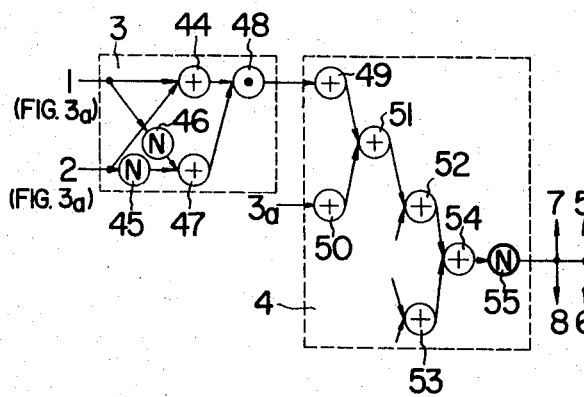
Figure 3C:
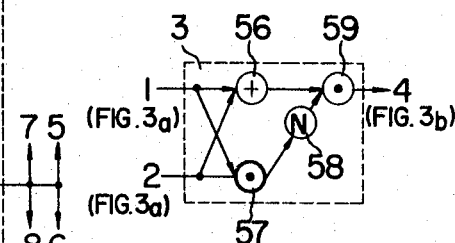

FIG. 3a is a schematic connection diagram showing specific examples of actual circuit organizations of logical circuits 1 and 2, comparison circuit 3, comparison detection circuit 4, program counter 6, and output register 7 in FIG. 1, comparison circuit 3 and comparison detection circuit 4 consisting of logical circuits producing output "0" at failure;

FIG. 3b is a similar schematic connection diagram showing an example wherein the circuits 3 and 4 consist of logical circuits producing output "1" at failure; and FIG. 3c is a similar schematic connection diagram showing an example wherein the comparison circuit 3 connected to a comparison detection circuit 4 consisting of a logical circuit producing output "1" at failure and a logical circuit producing output "0" at failure.

Referring to FIG. 1, the circuit organization of the fail-safe computer shown therein contains a logical circuit block 1 composed of elements producing output "0" at failure and a logical circuit block 2 composed of elements producing output "1" at failure connected to a comparison circuit 3 and a logical circuit block $1_a$ composed of elements producing output "0" at failure and a logical circuit block $2_a$ composed of elements producing output "1" at failure connected to a comparison circuit $3_a$. The comparison circuits 3 and $3_a$ are connected to a comparison detection circuit 4 adapted to supervise the outputs of a plurality of comparison circuits, including said circuits 3 and $3_a$, and to verify the normal state of the logical operations of the two systems.

In the above explanation, the logical circuit block corresponds to a functional block of the processing unit of a general computer. The respective logical circuit blocks in two circuit systems are mutually connected so as to compose processing units which produce respectively output "0" and "1" at failure. The circuit system can individually carry out the computing operation. However, connection relations of the logical circuit block, such as a circuit diagram of the processing unit, is not the subject matter of the invention, so that a detailed connection description of the logical circuit block is omitted herein. The logical circuit block comprises, however, an essential register such as an address register, a memory register, or an instruction register, etc., and information paths such as an arithmetic output line, or input line, etc.

Furthermore, the comparison detection circuit 4 is connected between an output register 7 of the system producing output "0" at failure and an output register 8 of the system producing output "1" at failure and, moreover, is connected to a program counter 5 of the system producing output "0" at failure and a program counter 6 of the system producing outputs "1" at failure.

By this organization, the same contents are always stored in or transferred to the logical circuits 1 and 2 and logical circuits $1_a$ and $2_a$ respectively composed of elements producing outputs "0" and "1" at failure.

Furthermore, since comparison circuits as represented by 3 and $3_a$ are provided in the principal registers and information paths of the computer, the two systems are constantly under surveillance, and, if a malfunction occurs in either or both of the two systems, the comparison circuits 3 and $3_a$ will immediately cease producing outputs, and output signals will not be sent to the comparison detection circuit 4.

The output signal of the comparison detection circuit 4 has the following two important functions.

The first important function is to control the progress of the computer program. More specifically, the output signal of the comparison detection circuit 4 is transmitted to the program counters 5 and 6 to govern the control of these program counters.

In the computer according to the invention, the program counters 5 and 6 can count up only when there is an output signal from the comparison detection circuit 4, that is, only when the operational contents of the two systems are coincident. When there is no output signal from the comparison detection circuit 4, the counting up operations of the program counters 5 and 6 are suppressed, and the contents of the program counters remain unchanged or are cleared to zero.

The second important function of the output signal of the comparison detection circuit 4 is to control, directly, the output registers. More specifically, the output signal of the comparison detection circuit 4 is transmitted to the output registers 7 and 8 to control directly the transmission of the outputs on the unsafe side of the output registers, for example, outputs representing the proceed signals of signal control registers in railway signals.

As is apparent from the above description, the output registers have a highly important significance. Accordingly, in order to indicate still more clearly the nature of this point, the following detailed description with respect to one example of an output register particularly of a system producing output "0" at failure is set forth with reference to FIG. 2.

Figure 2:
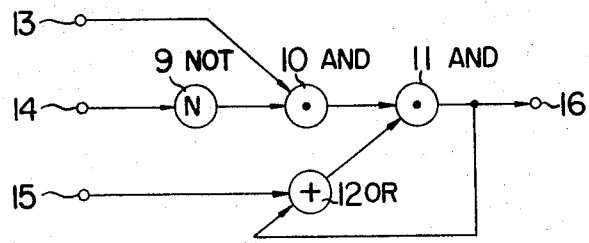
FIG. 2 is a schematic diagram showing one example of the circuit of an output register which produces an output "0" when a failure occurs.

Referring to FIG. 2, the output register of the circuit organization illustrated therein comprises a "NOT" logical element 9, "AND" logical elements 10 and 11, an "OR" logical element 12, an input terminal 13 for receiving the output signal of the comparison detection circuit 4 shown in FIG. 1, a resetting signal input terminal 14, a setting signal input terminal 15, and an output terminal 16 for sending out the content of the output register. The "NOT" logical element 9, "AND" logical elements 10 and 11, and "OR" logical element 12 are all of a system producing output "0" at failure, and a malfunction in any of these logical elements always causes the output to become "0".

This output register operates in the following manner. When the output signal of the comparison detection circuit 4 shown in FIG. 1 is no longer produced, the input of the input terminal 13 shown in FIG. 2 becomes zero. As a result, the outputs of the "AND" logical elements 10 and 11 become zero, and the content of the output register always operates on the safe side "0". Then, for the output register to send out an output "1" on the unsafe side, it is necessary that the output signal of the comparison detection circuit 4 be applied again to the input terminal 13 to indicate that the operational contents of the two systems are coincident, and then a set signal be applied to the input terminal 15.

Furthermore, since the input setting signal received by the input terminal 15 is subjected to ample checking in the software and then transmitted out in accordance with the prescribed program it is possible to realize a fail-safe state.

Specific examples of actual circuit organizations of circuits 1, 2, 3, 4, 6, and 7 indicated by blocks in FIG. 1 are shown in FIGS. 3a, 3a, and 3c. In the circuit arrangement shown in FIG. 3a, dotted*ine enclosure* 1 represents a register composed of logical elements 17, 18, and 19 which produce output "0" at failure, and enclosure 2 represents a register composed of logical elements 20, 21, and 22 which produce output "1" at failure. Although the logical elements 17, 18, 19 and the logical elements 20, 21, and 22 are indicated by the same symbols in the drawing, their characteristics are different from one another as mentioned above. Logical elements 23, 24, 25, 26, and 27 within enclosure 3 produce output "0" at failure and constitute a comparison circuit, and logical elements 28, 29, 30, 31, 32, and 33 within enclosure 4 are "AND" circuits producing output "0" at failure and constitute a comparison detection circuit. Logical elements 34, 35, 36, 37, 38, 39, and 40 within enclosure 6 produce output "1" at failure and constitute a program counter for one digit position which receives count-up signals through input terminal 41 and sends out outputs through terminals 42 and 43. Enclosure 7 comprising logical elements 9, 10, 11, and 12 represents output register 7 shown in FIG. 2. A delay circuit $11_a$ is shown in the output register 7 in FIG. 3a but, depending on the kinds of logical elements used, may be omitted as in the arrangement shown in FIG. 2.

While an example of organization wherein comparison circuit 3 and comparison detection circuit 4 are composed of logical circuits producing outputs "0" is illustrated in FIG. $3_a$, it is possible also to compose these circuits of logical elements producing output "1" at failure as illustrated by one example in FIG. 3b. Comparison circuit 3 shown in FIG. 3b is composed of logical circuits 44, 45, 46, 47, 48 each producing output "1" at failure and transmits an output corresponding to "1" to comparison detection circuit 4 when the states of the two systems become noncoincident.

Enclosure 4 in FIG. 3b represents the comparison detection circuit, which is composed of "OR" circuits 49, 50, 51, 52, 53, and 54 all producing outputs "1" at failure, and which produces an output corresponding to "1" immediately upon the occurrence of a malfunction in any one of the other comparison circuits ($3_a$, ....... ). This output is inverted in value by a "NOT" circuit 55 and can thereby be detected. The "NOT" circuit 55 consists of a logical circuit producing output "0" at failure to be transmitted to circuits 5, 6, 7, and 8.

FIG. 3c illustrates one example of a comparison circuit 3 in which mixed use is made of basic circuits producing outputs "1" at failure and a logical circuit producing output "0" at failure in one part of the circuit 3. Logical circuits 56, 58, and 59 produce outputs "1" at failure, and logical circuit 57 produces output "0" at failure. The resulting output value is transmitted to a comparison detection circuit similar to circuit 4 in FIG. 3b and is detected.

The organizations of circuits 3 and 4 are not limited to the examples of organization described above and illustrated in FIGS. 3a, 3b, and 3c, various other organizations being possible in accordance with the De Morgan theorem in Boolean algebra.

Thus, in the computer according to the invention, each output register can send out an output on the unsafe side only when there is an output signal from the comparison detection circuits 4, that is, only when the operational contents of the two systems are coincident. Accordingly, when a malfunction develops in the system, the output signal of the comparison detection circuit 4 always becomes zero, and the output register immediately operates on the safe side.

As will be apparent from the foregoing description, the computer of the invention affords fail-safe operation in a computer which could not be attained in the case of known computers for control. Accordingly, the computer of the invention can be applied principally to control of objects which are subject to serious consequences in the event of malfunctioning of the control computer, as for example, an interlocking system for railway signals. Thus, the present invention affords a great expansion of the scope of applications of computers for control.

The principal advantageous results afforded by the introduction of a computer into the interlocking system for railway signals are as follows:
1. Standardization, unification, and simplification of equipment can be realized; construction and installation can be simplified; and installation costs can be reduced.
2. Modernization of maintenance can be furthered, and reliability can be increased by achieving protective maintenance.
3. Since coupling is possible with various automation devices such as program route control devices, operational efficiency can be increased through introduction of features such as multiple-unit control and automatic interlocking.

It should be understood, of course, that the foregoing disclosure relates to only a preferred embodiment of the invention and that it is intended to cover all changes and modifications of the example of the invention herein chosen for the purposes of the disclosure.

I claim:
1. In an electronic computer for being controlled in accordance with a specific program, a fail-safe assembly comprising, in combination: two systems respectively producing outputs corresponding to "0" and "1" when a failure occurs therein, both systems being caused to carry out operations of the same content; each system having a processing unit including output registers, and information paths; and comparison circuits for detecting failures, said comparison circuits being disposed in said information paths and being coupled to said registers for producing output signals for controlling the progress of said program and for controlling outputs on the unsafe side of the output registers thereby causing the systems to operate always on the safe side when a failure occurs in any part thereof.

2. The fail-safe assembly as claimed in claim 1 in which each system contains a plurality of corresponding logical circuits, said logical circuits each having an output and in which corresponding logical circuit outputs are coupled respectively to said comparison circuits provided exclusively for said outputs, and further comprising a comparison detection circuit, the output of each comparison circuit being coupled to said comparison detection circuit, and the output of said comparison detection circuit being coupled to an output register and a program counter in each said system.

3. The fail-safe assembly as claimed in claim 2 in which each output register comprises a "NOT" logical element activatable by a resetting signal input; a first "AND" logical element activatable by the output of the comparison detection circuit and by the output of the "NOT" logical element; a second "AND" logical element; and an "OR" logical element being activatable by a setting signal and by the output of the second "AND" logical element, and said second "AND " element being activatable by the output of the first "AND" logical element and by the output of said "OR" logical element for producing an output transmitted to an output terminal.